United States Patent [19]

Mori et al.

[11] 4,369,303
[45] Jan. 18, 1983

[54] PROCESS FOR PRODUCING AN AROMATIC POLYESTERPOLYCARBONATE

[75] Inventors: Hazime Mori; Katsuhisa Kohyama; Katsuhiko Nakamura, all of Kitakyushu; Katsuyuki Sakata, Nakama; Akira Matsuno, Kitakyushu, all of Japan

[73] Assignee: Mitsubishi Chemical Industries Limited, Tokyo, Japan

[21] Appl. No.: 200,596

[22] Filed: Oct. 24, 1980

[30] Foreign Application Priority Data

Oct. 24, 1979 [JP] Japan ............... 54-137471

[51] Int. Cl.$^3$ ............... C08G 63/64
[52] U.S. Cl. ............... 528/173; 525/439; 528/176; 528/179; 528/182; 528/191; 528/194; 528/370; 528/371; 528/372
[58] Field of Search ............ 528/176, 191, 194, 173, 528/179, 182, 370, 371, 372; 525/439

[56] References Cited

U.S. PATENT DOCUMENTS

| | | | |
|---|---|---|---|
| 3,030,331 | 4/1962 | Goldberg | 528/176 |
| 3,161,615 | 12/1964 | Goldberg | 525/439 |
| 3,166,606 | 1/1965 | Reinking et al. | 525/439 |
| 3,169,121 | 2/1965 | Goldberg | 260/47 |
| 4,216,298 | 8/1980 | Schreckenberg et al. | 525/439 |
| 4,238,597 | 12/1980 | Markezich et al. | 525/439 |
| 4,267,303 | 5/1981 | Konig et al. | 525/439 |
| 4,286,083 | 8/1981 | Kochanowski | 525/439 |

FOREIGN PATENT DOCUMENTS

| | | |
|---|---|---|
| 10840 | 8/1979 | European Pat. Off. |
| 13761 | 12/1979 | European Pat. Off. |
| 2346386 | 4/1977 | France |

OTHER PUBLICATIONS

Polymer Science USSR, vol. 9, 1967, No. 7, Mar., 1968, pp. 1705-1711, G. S. Kolesnikov et al., "Study of Polyestercarbonates Based on Diane, Phosgene and the Dichloride of Terephthalic Acid".

Polymer Science USSR, vol. 10, 1968, No. 1, Oct., 1968, pp. 170-177, H. S. Kolesnikov et al., "The Synthesis and Properties of Mixed Polyesters from Phosgene, Terephthalyl Dichloride and 2,2-DI-(3-methyl-4-hydroxyphenyl) Propane".

*Primary Examiner*—Lester L. Lee
*Attorney, Agent, or Firm*—Oblon, Fisher, Spivak, McClelland & Maier

[57] ABSTRACT

A process for producing an aromatic polyesterpolycarbonate, which comprises polycondensing (a) a dihydroxydiaryl compound, (b) a terephthaloyl chloride and/or isophthaloyl chloride reactant, and (c) phosgene by an interfacial polymerization process in the presence of water, methylene chloride and an acid binding agent thereby preparing an aromatic polyesterpolycarbonate product containing structural units of the formula:

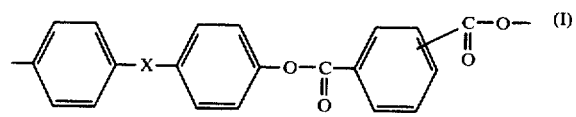

wherein X is a divalent group, and the aromatic rings may be substituted, and structural units of the formula:

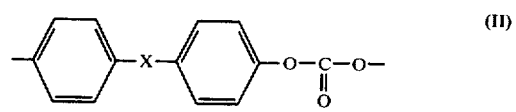

wherein X is a divalent group, and the aromatic rings may be substituted, said condensation reaction being characterized in that after at least 95% of the total —COCl groups in the terephthaloyl chloride and/or isophthaloyl chloride and phosgene starting materials has reacted, a chloroformate compound or additional phosgene is added to the reaction mixture in an amount to bring the concentration of —COCl groups to a level of 10 to 1000 μeq/g relative to the total amount of the above starting materials to complete the reaction.

10 Claims, No Drawings

PROCESS FOR PRODUCING AN AROMATIC POLYESTERPOLYCARBONATE

BACKGROUND OF THE INVENTION

1. Field of the Invention

The present invention relates to a process for producing an aromatic polyesterpolycarbonate, and more particularly to the production of an aromatic polyesterpolycarbonate having an improved washability in a methylene chloride solution of the polymer.

2. Description of the Prior Art

Aromatic polyesterpolycarbonates prepared from a dihydroxydiaryl compound, such as 2,2-bis (4-hydroxyphenyl) propane (bisphenol A), terephthaloyl chloride and/or isophthaloyl chloride and phosgene as starting materials, are superior to other similar materials with respect to various properties such as mechanical properties, thermal stability, chemical resistance, and transparency. It is known as described in Japanese Patent Application No. 97592 of 1978 and Japanese Patent Application No. 111518 of 1978 that aromatic polyesterpolycarbonates can be prepared by means of an interfacial polycondensation reaction involving the use of an aqueous alkali solution of a dihydroxydiaryl compound, a methylene chloride solution of terephthaloyl chloride or a mixture of terephthaloyl chloride and isophthaloyl chloride, and phosgene. In this method, the methylene chloride solution of the polymer obtained from the polycondensation reaction is subject to washing with water or an aqueous washing solution to remove impurities such as unreacted bisphenol A, catalysts and the like, and then the polymer is recovered from the methylene chloride solution of the polymer as a solid substance. The washing of the methylene chloride solution of the polymer is conducted by repeating the operation in which the methylene chloride solution is contacted with water or an aqueous washing solution and then separated. However, the methylene chloride solution of the polymer is not easily separated from the water or aqueous solution used for the washing step. That is, the water phase remains in the methylene chloride phase after the separation. Thus, this method has the drawback that the impurities cannot be easily removed.

SUMMARY OF THE INVENTION

Accordingly, one object of the present invention is to improve the washability of the methylene chloride solution of an aromatic polyesterpolycarbonate, thereby obtaining an aromatic polyesterpolycarbonate product containing few impurities.

Briefly, this object and other objects of the present invention, as hereinafter will become more readily apparent, can be attained by a process comprising polycondensing (a) a dihydroxydiaryl compound, (b) a terephthaloyl chloride and/or isophthaloyl chloride reactant, and (c) phosgene by an interfacial polymerization process in the presence of water, methylene chloride and an acid binding agent thereby preparing an aromatic polyesterpolycarbonate product containing structural units of the formula:

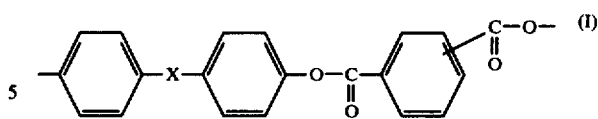

wherein X is a divalent group, and the aromatic rings may be substituted, and structural units of the formula:

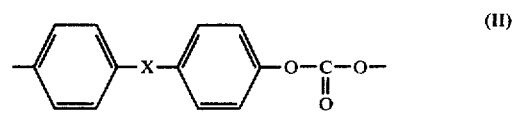

wherein X is a divalent group, and the aromatic rings may be substituted, said condensation reaction being characterized in that after at least 95% of the total —COCl groups in the terephthaloyl chloride and/or isophthaloyl chloride and phosgene starting materials has reacted, a chloroformate compound or additional phosgene is added to the reaction mixture in an amount to bring the concentration of —COCl groups to a level of 10 to 1000 μeq/g relative to the total amount of the above starting materials to complete the reaction.

DETAILED DESCRIPTION OF THE PREFERRED EMBODIMENTS

In the research leading to the present invention, extensive studies were conducted on the washability of the methylene chloride solution containing the aromatic polyesterpolycarbonate and as a result, it has been found that at the time of preparing an aromatic polyesterpolycarbonate by the polycondensation of a dihydroxydiaryl compound, terephthaloyl chloride and/or isophthaloyl chloride and phosgene, by means of an interfacial polymerization process, if a predetermined amount of a chloroformate compound or phosgene is added at the end or after the completion of the polycondensation reaction and the reaction is further continued, the methylene chloride solution of the polymer thereby obtained can easily be washed with water or an aqueous washing agent, thereby making it possible to obtain a polymer containing little impurities.

The dihydroxydiaryl compound which can be used in the present process is represented by the formula:

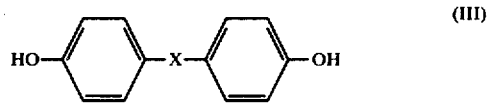

wherein X is a divalent group such as —CR$_2$—, C=R′, —O—, —S—, —SO— or —SO$_2$—, R is a hydrogen atom or a mono-valent hydrocarbon group, and R′ is a divalent hydrocarbon group, and wherein the aromatic rings may be substituted by halogen atoms or monovalent hydrocarbon groups. Suitable examples of compounds within the scope of the present invention include bis (hydroxyaryl) alkanes such as bis-(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, bis(4-hydroxyphenyl) phenyl methane, 2,2-bis(4-hydroxy-3-methylphenyl) propane, 1,1-bis(4-hydroxy-3-tertiary butylphenyl) propane, 2,2-bis(4-hydroxy-3- bromophenyl) propane, 2,2-bis(4-hydroxy-3,5-dibromophenyl) propane, and 2,2-bis(4-hydroxy-3,5-dichlorophenyl) propane; bis(hydroxyaryl) cycloalkanes such as 1,1-bis(4-hydroxyphenyl) cyclopentane, and 1,1-bis(4-hydroxyphenyl) cyclohexane; dihydroxydiaryl ethers such as 4,4'-dihydroxydiphenyl ether, 4,4'-dihydroxy-3,3'-dimethyldiphenyl ether; dihydroxydiaryl sulfides such as 4,4'-dihydroxydiphenyl sulfide, and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone, and 4,4'-dihydroxy-3,3'-dimethyldiphenyl sulfone.

The terephthaloyl chloride or isophthaloyl chloride reactant employed in the synthesis of the present product may be substituted on the benzene nucleus with a halogen atom such as chlorine or bromine, or a monovalent hydrocarbon group such as a methyl group. Suitable terephthaloyl chloride and isophthaloyl chloride reactants include methyl terephthaloyl chloride, chloroterephthaloyl chloride, 2,5-dimethyl terephthaloyl chloride, methyl isophthaloyl chloride, and chloroisophthaloyl chloride.

The acid binding agent used in the reaction to form the present product can be a caustic alkali such as sodium hydroxide or potassium hydroxide, or an organic base such as pyridine. However, sodium hydroxide is most suitable for industrial purposes.

In conducting the polycondensation reaction of the present invention, all of the starting materials may be mixed from the start of the reaction, or the reaction can be conducted by first contacting an aqueous alkali solution of the dihydroxydiaryl compound with a methylene chloride solution of terephthaloyl chloride and/or isophthaloyl chloride, and then reacting phosgene therewith with the previously mixed materials to obtain a methylene chloride solution of an oligomer having a terminal chloroformate group. Thereafter, another aqueous alkali solution of the dihydroxydiaryl compound is added to the mixture to complete the polycondensation reaction. In yet another technique, a methylene chloride solution of terephthaloyl chloride and/or isophthaloyl chloride, and phosgene is reacted with an aqueous alkali solution of the dihydroxydiaryl compound thereby obtaining a methylene chloride solution of an oligomer having a terminal chloroformate group. This solution is then mixed with an aqueous alkali solution of the dihydroxydiaryl compound to complete the polycondensation reaction.

In the first method described above, where all of the starting materials are mixed at the start of the reaction, the —COCl groups on the terephthaloyl chloride and/or isophthaloyl chloride molecules are converted into ester bonds and the —COCl groups in the phosgene are converted into carbonate bonds as the polycondensation reaction proceeds. In the latter methods wherein an oligomer having a terminal chloroformate group is first prepared and then the dihydroxydiaryl compound is added thereto for the start of the polycondensation reaction, the —COCl groups on the terephthaloyl chloride and/or isophthaloyl chloride molecules are converted into ester bonds during the preparation of the oligomer, and the —COCl groups on the terminal bisphenol A moieties of the oligomer are converted to carbonate bonds as the polycondensation reaction proceeds.

In an important embodiment of the present invention, a chloroformate compound or phosgene is added to and reacted with the components of a reaction mixture containing terephthaloyl chloride and/or isophthaloyl chloride and phosgene after at least 95% of the total —COCl groups in the terephthaloyl chloride and/or isophthaloyl chloride and phosgene have reacted. Suitable chloroformate compounds which can be used include any compound which has a chloroformate group. However, aromatic chloroformate compounds are preferably used since they do not affect the physical properties of the aromatic polyesterpolycarbonate. For instance, suitable bischloroformate compounds include the bischloroformate of the dihydroxydiaryl compound of formula (III), an oligomer having a terminal chloroformate group prepared by reacting the dihydroxydiaryl compound with phosgene, an oligomer having a terminal chloroformate group prepared by reacting the dihydroxydiaryl compound, terephthaloyl chloride or isophthaloyl chloride or a mixture thereof and phosgene, or a mono-chloroformate compound such as a chloroformate of phenol, p-tertiary butyl phenol, or cresol.

The amount of the chloroformate compound or phosgene to be added to the reaction mixture is such that the —COCl groups constitute 10 to 1000 $\mu$eq/g, preferably 50 to 500 $\mu$eq/g, relative to the total amount of the starting materials. The weight of the aromatic polyesterpolycarbonate before adding the chloroformate compound or additional phosgene corresponds to 70–90%, for example about 80%, by weight of the total starting materials substantially comprising dihydroxydiaryl compound, tere(iso)phthaloyl chloride and phosgene. Therefore, in this invention, the chloroformate compound or additional phosgene may be controlled in an amount to bring the concentration of the —COCl groups to a level of 10 to 1500 $\mu$eq/g relative to the amount of the aromatic polyesterpolycarbonate. If the amount of chloroformate compound or additional phosgene added is too small, no improvement in the washability of the methylene chloride solution of the polymer can be expected. On the other hand, if the amount of chloroformate compound or additional phosgene added is too much and if the chloroformate compound used is a mono-chloroformate compound, the monochloroformate compound will bond to the polymer by the carbonate bond and accordingly there will be no such disadvantage such as the chloroformate group remaining at the terminus of the polymer. However, if a dichloroformate compound, or phosgene is used as the chloroformate compound, and if the amount is too much, the chloroformate groups tend to remain in the polymer after reaction with the polymer and no improvement in the washability of the methylene chloride solution of the polymer is attained. The product polymer thereby obtained tends to have a poor thermal stability. Polymer products containing these remaining chloroformate groups, after the reaction of the chloroformate compound of the present invention or phosgene with the reaction mixtures can be hydrolyzed by the action of an alkali with the result that the chloroformate groups are decomposed into hydroxyl groups and at the same time react with still undecomposed chloroformate groups to form carbonate bonds. Further, if a phenol type terminator is used, the chloroformate groups react with the hydroxyl groups of the terminator to form carbonate bonds. It is possible thus to reduce the remaining chloroformate groups. However, if the quantity of remaining chloroformate groups is too great, chloroformate groups will still remain some of which cannot be converted into carbonate bonds. It is difficult to eliminate inconvenience incurred by the presence of the residual chloroformate groups.

The chloroformate compound or additional phosgene may be added to the reaction mixture at any time after 95% or more of the total —COCl groups in the terephthaloyl chloride and or isophthaloyl chloride reactants and phosgene, as the starting materials, have reacted. If the timing of the addition is too early, the effectiveness of the present invention cannot be expected. Normally, it is preferable to choose the timing of the addition after at least 98% of the —COCl groups has reacted to within the point where —COCl groups can be no more observed in the reaction mixture. The number of —COCl groups which have reacted can be determined by measuring the —COCl groups in the reaction mixture, for example, by sampling the methylene chloride phase of the reaction mixture, subjecting the sample to alkali decomposition with an alcoholic sodium hydroxide solution and then titrating the sodium chloride thereby formed with silver nitrate. This type of measurement can be conducted beforehand to obtain the relationship between the reaction time and the amount of reacted —COCl groups so that the obtained relationship can be applied to an actual reaction.

The reaction, subsequent to the addition of the chloroformate compound or phosgene, can be conducted under the conditions similar to those of the polycondensation reaction for the production of the above-described aromatic polyesterpolycarbonate. Normally, after the addition of the chloroformate compound or phosgene to the reaction mixture of the polycondensation reaction, stirring is continued for further reaction. The time required for the further reaction is from 10 minutes to 3 hours, normally from 20 minutes to 2 hours.

In order to obtain an aromatic polyesterpolycarbonate product having superior properties such as heat resistance, thermal stability, mechanical properties, and transparency, the amounts of the starting materials and the amount of the chloroformate compound or phosgene later added to the reactants are selected such that the compositional molar ratio of the dihydroxydiaryl compound residual groups to terephthalic and/or isophthalic residual groups to carbonate bonds is in the range of 1:0.33 to 0.75:0.67 to 0.25, preferably 1:0.38 to 0.6:0.62 to 0.4.

It is not entirely clear why the process of the present invention yields a methylene chloride solution containing a polymer having good washability. The polymer obtained from a polycondensation reaction using a normal interfacial polymerization process with predetermined amounts of the dihydroxydiaryl compound, the terephthaloyl chloride and/or isophthaloyl chloride and phosgene, has a small amount of hydroxyl groups at its terminals, which are believed to impart an adverse effect on the washability of the product. In the present invention, on the other hand, these hydroxyl groups are converted into carbonate groups, which is believed to be the reason for the improved washability of the present product to the extent that it is possible to adequately remove impurities from the polymer by a simple washing operation, thereby obtaining an aromatic polyesterpolycarbonate of a high quality.

Having generally described this invention, a further understanding can be obtained by reference to certain specific examples which are provided herein for purposes of illustration only and are not intended to be limiting unless otherwise specified.

In the examples, the terms "%" and "parts" means "% by weight" and "parts by weight", respectively. Moreover, the weight average molecular weight (Mw) is a value calculated by the formula:

$$\eta_{sp}/c = [\eta] + 0.427C\cdot[\eta]^2$$

$$[\eta] = 4.60 \times 10^{-4} M_w \cdot 0.69$$

on the basis of the value of $\eta_{sp}/C$ measured at 20° C. at the polymer concentration of 0.6 g/dl in methylene chloride solvent. The amount of chloroformate groups is a value calculated from the analysis of chlorine from the decomposition of the oligomer. The amount of terminal carboxyl groups is a value obtained by titration with a NaOH ethanol solution. The values for the compositional molar ratios shown were obtained from the ratio of the peaks at 1740 cm$^{-1}$ for the —COO— group and at 1770 cm$^{-1}$ for the —OCOO— group, by infrared spectrum analysis. Water contents were measured by the Karl Fisher method.

EXAMPLE 1

Into a reactor tube having an inner diameter of 6 mm and a length of 15 m, 66.5 kg/hr of a methylene chloride solution containing 4% terephthaloyl chloride and 1.3 kg/hr phosgene were introduced, and from a side tube provided at a point 1 m from the inlet and having an inner diameter of 6 mm, 33.2 kg/hr of an aqueous alkali solution containing 0.15% of triethylamine and 13.5% of bisphenol A (prepared by dissolving triethylamine and bisphenol A in a 5.5% sodium hydroxide aqueous solution) were introduced and the reaction was conducted whereby an oligomer product having terminal chloroformate groups was obtained.

The reactor tube was coiled into a helical form and was cooled by being dipped into a water tank kept at 20° C. The reaction mixture which was discharged from the reactor tube separated into a methylene chloride phase containing the oligomer and a water phase immediately after it was gathered in a receptacle.

The methylene chloride phase had an oligomer concentration of 11% and contained 0.26 eq/l of chloroformate groups.

325 Parts of the obtained methylene chloride phase were fed into an agitation tank, and 0.81 part of p-tertiary butyl phenol, 55.0 parts of an aqueous alkali solution containing 13.5% of bisphenol A, 6 parts of an aqueous solution containing 2% of triethylamine and 500 parts of water were added thereto, and while stirring, the polycondensation reaction was started.

After the passage of 20 minutes from the start of the reaction, the —COCl groups in the reaction mixture were measured and no —COCl groups were detected. To this reaction mixture containing 47 parts of total starting materials, 10 parts of a methylene chloride solution (specific gravity:1.3) of polycarbonate oligomer containing 0.97 eq/l of chloroformate groups (the concentration of —COCl groups being 160 μeq/g relative to the starting materials), prepared from bisphenol A and phosgene was added, and the reaction was continued for 10 minutes. Thereafter, 10 parts of a 25% sodium hydroxide aqueous solution was added and the agitation was continued for an additional 30 minutes to complete the reaction. With the termination of agitation of the solution, the reaction liquid began to separate immediately and completely separated one minute later. The separated methylene chloride phase contained 10.8% of water. To this methylene chloride phase, 750 parts of methylene chloride were added to dilute the polymer concentration to a level of about 3%, and thereafter the solution was washed by an operation consisting of 3 steps in which in each step, the solution was washed by stirring with one of the washing agents shown in the table below followed by allowing the mixture to stand for the separation of phases in the agitation tank under the conditions indicated in Table 1. The amount of water in the methylene chloride solution after each washing step was measured upon completion of each step.

TABLE 1

| | Agitation & Mixing | | | Left to stand still for separation | | Amount of water in the methylene chloride solution (%) |
|---|---|---|---|---|---|---|
| Step | Aqueous washing agent | Water phase ratio | Time (Min.) | Time (Min.) | State of separation | |
| 1 | 0.1N HCl | 1.5 | 10 | 1 | good | 0.27 |
| 2 | water | 1.5 | 10 | 3 | good | 0.19 |
| 3 | water | 1.5 | 10 | 15 | good | 0.31 |

In the table above, the water phase ratio is the ratio of the weight of the water phase to the weight of the methylene chloride phase.

The methylene chloride phase after completion of each washing step was transparent, and there were no operational inconveniences incurred such as the formation of a dirt layer at the time of the phase separation. The water phase which separated in the third washing step was tested for the presence of chloride ions by dropping an aqueous solution of silver nitrate into the solution. The lack of the formation of solution turbidity indicated that the solution was adequately washed.

The aromatic polyesterpolycarbonate obtained by evaporating the methylene chloride from the methylene chloride solution of the polymer thus obtained after the washing operation had a weight average molecular weight of 31,200, a compositional molar ratio of bisphenol A residual groups to terephthalic residual groups to carbonate bonds of 1:0.45:0.55, terminal hydroxyl groups of 8.1 $\mu$eq/g and terminal carboxyl groups of 4.2 $\mu$eq/g.

The aromatic polyesterpolycarbonate product was heated for 5 minutes in a melt indexer kept at 300° C. and then extruded. The extruded product still had a weight average molecular weight of 31,200 and no decrease in the molecular weight was observed.

EXAMPLE 2

A polycondensation reaction was started in the same manner as described in Example 1. After the passage of 20 minutes from the start of the reaction, 30 parts of a methylene chloride solution of a polycarbonate oligomer (the concentration of —COCl groups being 480 $\mu$eq/g relative to the starting materials) (the same as that used in Example 1) was added to the reaction mixture and the reaction was continued for 10 minutes. Thereafter, 15 parts of a 25% sodium hydroxide aqueous solution was added and the agitation was continued for an additional 30 minutes to complete the reaction.

The washability of the methylene chloride solution of the polymer thus obtained was as good as that in Example 1. The aromatic polyesterpolycarbonate obtained had a weight average molecular weight of 31,400, a compositional molar ratio of bisphenol A residual groups to terephthalic residual groups to carbonate bonds of 1:0.44:0.56, a terminal hydroxyl group content of 5.3 $\mu$eq/g and a terminal carboxyl group content of 4.1 $\mu$eq/g.

This aromatic polyesterpolycarbonate was heated for 5 minutes in a melt indexer kept at 300° C. and then extruded. The extruded product still had a weight average molecular weight of 31,400 with no decrease in the molecular weight being observed.

EXAMPLE 3

The polycondensation reaction was started in the same manner as described in Example 1. After the passage of 20 minutes from the start of the reaction, 6 parts of a methylene chloride solution of polycarbonate oligomer (the concentration of —COCl groups being 96 $\mu$eq/g relative to the starting materials) (the same as that used in Example 1) was added to this reaction mixture and the reaction was continued for 10 minutes. Thereafter, the operation was carried out in the same way as described in Example 1.

The washability of the methylene chloride solution of the polymer thus obtained was as good as that in Example 1. The aromatic polyesterpolycarbonate product obtained had a weight average molecular weight of 31,000, a compositional molar ratio of bisphenol A residual groups to terephthalic residual groups to carbonate bonds of 1:0.45:0.55, a terminal hydroxyl group content of 8.6 $\mu$eq/g and a terminal carboxyl group content of 4.0 $\mu$eq/g.

This aromatic polyesterpolycarbonate was heated for 5 minutes in a melt indexer kept at 300° C. and then extruded. The extruded product still had a weight average molecular weight of 31,000 and no decrease in the molecular weight was observed.

COMPARATIVE EXAMPLE 1

The polycondensation reaction of Example 1 was repeated with the exception that the methylene chloride solution of the polycarbonate oligomer containing 0.97 eq/l of chloroformate groups was not added to the reaction medium. After the passage of 30 minutes from the start of the polycondensation reaction, 10 parts of a 25% sodium hydroxide aqueous solution was added and stirring was continued for 30 minutes to complete the reaction. After stirring was stopped, the reaction liquid began to separate immediately and was completely separated two minutes later. The separated methylene chloride phase contained 28% water. To the methylene chloride phase was added 750 parts of methylene chloride to dilute the polymer concentration to a level of about 3%, and the washing operation was carried out under the same conditions as described in Example 1. The results are shown in Table 2.

TABLE 2

| | Agitation & Mixing | | Left to stand still for separation | | Water content in the methylene chloride solution (%) |
|---|---|---|---|---|---|
| Step | Water phase ratio | Time (Min.) | Time (Min.) | State of separation | |
| 1 | 1.5 | 10 | 2 | certain dirt layer formed | 1.46 |
| 2 | 1.5 | 10 | 10 | Dirt layer exists; | 1.62 |

TABLE 2-continued

| Step | Agitation & Mixing Water phase ratio | Agitation & Mixing Time (Min.) | Left to stand still for separation Time (Min.) | Left to stand still for separation State of separation | Water content in the methylene chloride solution (%) |
|---|---|---|---|---|---|
| 3 | 1.5 | 10 | 60 | The methylene chloride layer has white turbidity Dirt layer exists; The methylene chloride phase has milky white turbidity | 1.88 |

The aromatic polyesterpolycarbonate product obtained by evaporating the methylene chloride from the methylene chloride solution of the polymer thus obtained after the washing operation had a weight average molecular weight of 20,900, a compositional molar ratio of the bisphenol A residual groups to terephthalic residual groups to carbonate bonds of 1:0.48:0.52, a terminal hydroxyl group content of 69.8 μeq/g and a terminal carboxyl group content of 13.8 μeq/g. The product was heated for 5 minutes in a melt indexer kept at 300° C. and then extruded. The extruded product had a weight average molecular weight of 18,100, indicating a decrease in the molecular weight of 13.4%.

EXAMPLE 4

The polycondensation reaction of Example 1 was repeated with the exception that instead of the addition of a methylene chloride solution of polycarbonate oligomer containing 0.97 eq/l of chloroformate groups, 15 parts of a methylene chloride solution (specific gravity: 1.3) of phenylchloroformate containing 0.64 eq/l of chloroformate groups (the concentration of —COCl groups being 158 μeq/g relative to the starting materials), was added to the reaction mixture.

The washability of the methylene chloride solution of the polymer thus obtained was as good as that of Example 1. The aromatic polyesterpolycarbonate product obtained had a weight average molecular weight of 27,500, a compositional molar ratio of the bisphenol A residual groups to terephthalic residual groups to carbonate bonds of 1:0.47:0.53, a terminal hydroxyl group content of 6.9 μeq/g and a terminal carboxyl group content of 3.8 μeq/g. The product was heated for 5 minutes in a melt indexer kept at 300° C. and then extruded. The extruded product had a weight average molecular weight of 27,300 and showed little reduction in molecular weight.

Having now fully disclosed the invention, it will be apparent to one of ordinary skill in the art that many changes and modifications can be made thereto without departing from the spirit or scope of the invention as set forth herein.

What is claimed as new and intended to be secured by Letters Patent of the United States is:

1. A process for producing an aromatic polyesterpolycarbonate, which comprises: polycondensing (a) a dihydroxydiaryl compound, (b) a terephthaloyl chloride and/or isophthaloyl chloride reactant, and (c) phosgene by an interfacial polymerization process in the presence of water, methylene chloride and an acid binding agent thereby preparing an aromatic polyesterpolycarbonate product containing structural units of the formula:

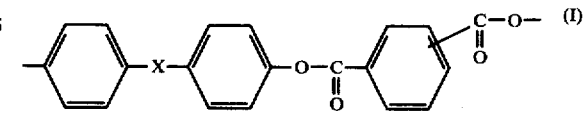

wherein X is a divalent group selected from the group comprising —CR$_2$—, =C=R', —O—, —S—, —SO—, or —SO$_2$—, wherein R is hydrogen or a monovalent hydrocarbon group and R' is a divalent hydrocarbon group, and the aromatic rings may be substituted with halogen or monovalent hydrocarbon groups, said condensation reaction being characterized in that after at least 95% of the total —COCl groups in the terephthaloyl chloride and/or isophthaloyl chloride and phosgene starting materials has reacted an oligomer having a terminal chloroformate group prepared by reacting the dihydroxydiaryl compound with phosgene, or an oligomer having a terminal chloroformate group prepared by reacting the dihydroxydiaryl compound, terephthaloyl chloride or isophthaloyl chloride or a mixture thereof and phosgene, is added to the reaction mixture in an amount to bring the concentration of —COCl groups to a level of 10 to 1000 eq/g relative to the total amount of the above starting materials to complete the reaction.

2. The process of claim 1, wherein said chloroformate compound is a polycarbonate oligomer having a terminal chloroformate group prepared by reacting said dihydroxydiaryl compound with phosgene.

3. The process of claim 1, wherein said chloroformate compound is a chloroformate of a phenol compound.

4. The process of claim 1, 2 or 3, wherein said concentration of —COCl groups is 50 to 500 μeq/g relative to the total amount of starting materials.

5. The process of claim 1 wherein said dihydroxydiaryl compound is a bis(hydroxyaryl) alkane, a bis(hydroxyaryl) cycloalkane, a dihydroxyaryl ether, a dihydroxydiaryl sulfide, a dihydroxydiaryl sulfoxide or a dihydroxydiaryl sulfone.

6. The process of claim 1, wherein said terephthaloyl chloride reactant is methylterephthaloyl chloride, chloroterephthaloyl chloride or 2,5-dimethylterephthaloyl chloride and wherein said isophthaloyl chloride is methylisophthaloyl chloride or chloroisophthaloyl chloride.

7. The process of claim 1, wherein said binding agent is a caustic alkali or an organic base.

8. The process of claim 1, wherein said dihydroxydiaryl compound is bis(4-hydroxyphenyl) methane.

9. The process of claim 1, wherein said terephthaloyl chloride and isophthaloyl chloride reactants are terephthaloyl chloride and isophthaloyl chloride respectively.

10. A process for producing an aromatic polyesterpolycarbonate, which comprises poly-condensing (a) a dihydroxydiaryl compound, (b) a terephthaloyl chloride and/or isophthaloyl chloride reactant, and (c) phosgene by an interfacial polymerization process in the presence of water, methylene chloride and an acid binding agent thereby preparing an aromatic polyesterpolycarbonate product containing structural units of the formula:

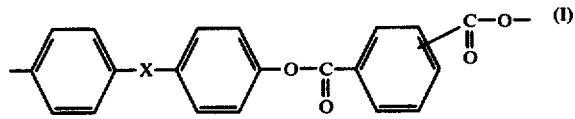
(I)

wherein X is a divalent group selected from the group comprising —CR$_2$—, =C=R', —O—, —S—, —SO—, or —SO$_2$—, wherein R is hydrogen or a monovalent hydrocarbon group and R' is a divalent hydrocarbon group, and the aromatic rings may be substituted with halogen or monovalent hydrocarbon groups, and structural units of the formula:

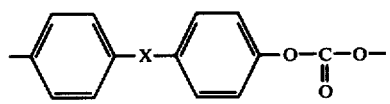
(II)

wherein X is a divalent group selected from the group comprising —CR$_2$—, =C=R', —O—, —S—, —SO—, or —SO$_2$—, wherein R is hydrogen or a monovalent hydrocarbon group and R' is a divalent hydrocarbon group, and the aromatic rings may be substituted with halogens or monovalent hydrocarbon groups, said condensation reaction being characterized in that after at least 95% of the total —COCl groups in the terephthaloyl chloride and/or isophthaloyl chloride and phosgene starting materials has reacted an oligomer having a terminal chloroformate group prepared by reacting the dihydroxydiaryl compound with phosgene, or an oligomer having a terminal chloroformate group prepared by reacting the dihydroxydiaryl compound, terephthaloyl chloride or isophthaloyl chloride or a mixture thereof and phosgene, is added to the reaction mixture in an amount to bring the concentration of —COCl groups to a level of 10 to 1500 eq/g relative to the aromatic polyesterpolycarbonate present before adding the chloroformate compound.

* * * * *